x`x`x`

(12) United States Patent
Cagno et al.

(10) Patent No.: US 7,536,492 B2
(45) Date of Patent: May 19, 2009

(54) APPARATUS, SYSTEM, AND METHOD FOR AUTOMATICALLY RESETTING AN INTER-INTEGRATED CIRCUIT BUS

(75) Inventors: Brian James Cagno, Tucson, AZ (US); Kenny Nian Gau Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 11/626,230

(22) Filed: Jan. 23, 2007

(65) Prior Publication Data
US 2008/0177917 A1 Jul. 24, 2008

(51) Int. Cl.
*G06F 13/00* (2006.01)
*G06F 13/14* (2006.01)

(52) U.S. Cl. .................. 710/110; 710/100; 710/105; 710/305

(58) Field of Classification Search .................. 710/106; 326/59; 327/29
See application file for complete search history.

(56) References Cited

U.S. PATENT DOCUMENTS

| | | | | |
|---|---|---|---|---|
| 7,016,993 B2* | 3/2006 | Lee | ............... | 710/100 |
| 7,089,338 B1* | 8/2006 | Wooten et al. | .............. | 710/110 |
| 7,355,438 B2* | 4/2008 | El Sayed | ...................... | 326/30 |
| 2004/0117525 A1* | 6/2004 | Lee | .............................. | 710/104 |
| 2006/0242348 A1* | 10/2006 | Humphrey et al. | .......... | 710/305 |
| 2007/0103166 A1* | 5/2007 | El Sayed | .................... | 324/522 |
| 2007/0112990 A1* | 5/2007 | Hayashita | .................... | 710/305 |
| 2007/0240019 A1* | 10/2007 | Brady et al. | ................... | 714/43 |

FOREIGN PATENT DOCUMENTS

WO  WO 2005032060 A1 *  4/2005

OTHER PUBLICATIONS

Philips Semiconductors; "The I2C-Bus Specification"; Philips Semiconductors; Revision 2.1; Jan. 2000; all pages.*

* cited by examiner

*Primary Examiner*—Paul R Myers
*Assistant Examiner*—Ryan M Stiglic
(74) *Attorney, Agent, or Firm*—Kunzler & McKenzie

(57) ABSTRACT

An apparatus, system, and method are disclosed for resetting an inter-integrated circuit (I2C) bus slave. A data line resistor in series is provided with a data line of an I2C bus in communication with the I2C bus slave. A clock line resistor in series is provided with a clock line of the I2C bus. A data line differential amplifier detects a first specified voltage across the data line resistor and a clock line differential amplifier detects a second specified voltage across the clock line resistor wherein the first specified voltage is substantially equal to a data line resistor resistance multiplied by a specified current and the second specified voltage is substantially equal to a clock line resistor resistance multiplied by the specified current. A time module detects the first and second specified voltage for a specified time interval. A reset module resets the I2C bus slave in response detecting the first and second specified voltage for the specified time interval.

2 Claims, 2 Drawing Sheets

APPARATUS, SYSTEM, AND METHOD FOR AUTOMATICALLY RESETTING AN INTER-INTEGRATED CIRCUIT BUS

CROSS-REFERENCES TO RELATED APPLICATIONS

The subject matter of this application is related to two United States patent applications, the first entitled "APPARATUS, SYSTEM, AND METHOD FOR RESETTING AN INTER-INTEGRATED CIRCUIT DATA LINE WITH A CLOCK LINE" filed Jan. 23, 2007 as Ser. No. 11/626,220 and the second entitled "APPARATUS, SYSTEM, AND METHOD FOR RESETTING AN INTER-INTEGRATED CIRCUIT DATA LINE USING A NEGATIVE VOLTAGE" filed Jan. 23, 2007 as Ser. No. 11/262,227. This invention relates to resetting a bus and more particularly relates to resetting an Inter-Integrated Circuit (I2C) bus.

BACKGROUND OF THE INVENTION

1. Field of the Invention

This invention relates to resetting a bus and more particularly relates to resetting an Inter-Integrated Circuit (I2C) bus.

2. Description of the Related Art

The I2C serial protocol is often used to create a high-level communication path between devices in electronic systems. An I2C bus requires only a clock line and a data line, and operates using a simple communication protocol. The clock line and data line are each bi-directional. Each device connected to an I2C bus has a unique address. A device initiating a transfer is referred to as a bus master while devices responding to the transfer are referred to as bus slaves. Any I2C device may function as the bus master or as a bus slave. The simplicity and flexibility of the I2C bus makes it a cost effective communications solution in many applications.

The I2C bus master typically issues a START command over the I2C bus to other devices, followed by an address of a destination I2C bus slave device. In addition, the I2C bus master also specifies whether data will be read or written. The destination I2C bus slave transmits an ACKNOWLEDGE signal, and the I2C bus master transmits or receives data. When the transfer is complete, the I2C bus master transmits a STOP and the transaction concludes.

Unfortunately, the simplicity of the bus can be a disadvantage if one or more elements of the bus stops functioning, a condition referred to hereafter as a hang. There are only very limited recovery mechanisms built into I2C devices. When an I2C device hangs, the device typically must be reset to free the bus.

Unfortunately, I2C devices are often on different card boundaries within an electronic system. As a result, specific resets are not available for the hung I2C. If a specific reset is not available, a power cycle is required to free the bus. Yet a power cycle is often time consuming and can affect devices and systems far beyond the hung I2C device.

From the foregoing discussion, there is a need for an apparatus, system, and method that reset an I2C device. Beneficially, such an apparatus, system, and method would allow I2C devices to be reset without providing specific reset circuits and without cycling power for an extended system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
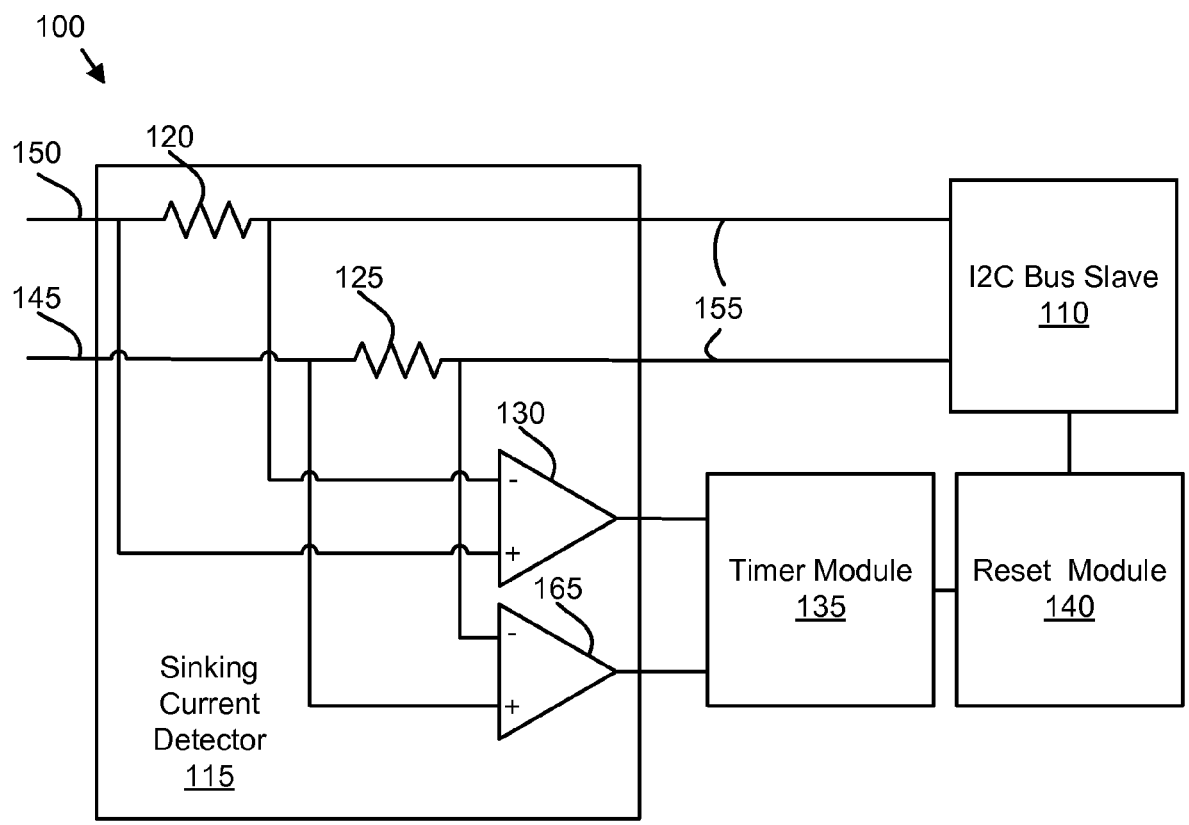
FIG. 1 is a schematic block diagram illustrating one embodiment of an apparatus to reset an I2C bus slave in accordance with the present invention.

FIG. 1 depicts a schematic block diagram illustrating one embodiment of an apparatus 100 to reset an I2C bus slave in accordance with the present invention. The apparatus 100 includes an I2C bus slave 110 in communication over a data line 150 and a clock line 145 with an I2C bus 155, a sinking current detector 115, a timer module 135, and a reset module 140. Communication between the I2C bus 155 and the I2C bus slave 110 may or may not be bi-directional. In an embodiment, the sinking current detector 115 may include a data line resistor 120, a clock line resistor 125, a data line differential amplifier 130, and a clock line differential amplifier 165. The I2C bus 155 and I2C bus slave 110 may be embodied by circuit cards, integrated circuits, portions of integrated circuits, or the like.

In the I2C bus slave resetting apparatus 100, devices initiating communication over the data line 150 are referred to as the I2C bus masters while devices responding to communication over the data line 150 are referred to as the I2C bus slaves 110. In an embodiment, any of the I2C devices may function as the bus master or as the bus slave. Although for simplicity in the drawings, only one I2C bus slave 110 is shown, any number of I2C bus slaves 110 may be reset by the apparatus 100 and the depicted I2C bus slave 110 may also be configured as an I2C bus master.

The I2C bus slave 110 communicates over the data line 150 and the clock line 145 of the I2C bus 155. The communication or transfer of data may be from the I2C bus 155 to the I2C bus slave 110 or in a reverse direction. In an embodiment, a current flows in the data line 150 and the clock line 145.

A sinking current detector 115 detects a specified current in the data line 150 and/or the clock line 145. When a line of the I2C bus 155 hangs, such as a data line hang and/or a clock line hang, the line draws current that is equal to or greater than the specified current. By detecting the specified current, the sinking current detector 115 detects a hung line. In an embodiment, sinking current detector 115 detects that the specified current in the data line 150 and/or the clock line 145 is in the range of one hundred microamps to one hundred milliamps (100 μA-100 mA). For example, the sinking current detector 115 may detect the specified current in the data line 150 and/or the clock line 145 is zero point zero zero one amperes (0.001 amps).

The sinking current detector 115 includes one or more data line resistors 120, one or more clock line resistors 125, one or more data line differential amplifiers 130, and one or more clock line differential amplifiers 165. In an embodiment, resistance of the data line resistor 120 and/or the clock line resistor 125 may be 1 to 20 ohms (1-20 Ω). For example, the clock line resistors 125 and the data line resistors 120 may be of the resistance of ten ohms (10 Ω).

The data line differential amplifier 130 and the clock line differential amplifier 165 are of the type of an electronic amplifier or the like that multiplies the difference between two inputs by some constant factor (the differential gain). Although for simplicity in the drawings, only one data line resistor 120, a clock line resistor 125, a data line differential amplifier 130, and a clock line differential amplifier 165 are shown, any number of data line resistors 120, clock line resistors 125, data line differential amplifiers 130, and clock line differential amplifiers 165 may be used in the apparatus 100.

The data line differential amplifier 130 detects a first specified voltage across the data line resistor 120. In an embodiment, the data line differential amplifier 130 detects that the first specified voltage across the data line resistor 120 is substantially equal to a data line resistor resistance multiplied by the specified current. For example, the data line differential amplifier 130 may detect that the specific voltage across the data line resistor 120 is zero point zero one volts (0.01V).

The clock line differential amplifier 165 detects a second specified voltage across the clock line resistor 125. In an embodiment, the clock line differential amplifier 165 detects that the first specified voltage across the clock line resistor 125 is substantially equal to a clock line resistor resistance multiplied by the specified current. For example, the clock line differential amplifier 165 may detect that the specific voltage across the clock line resistor 125 is zero point zero one volts (0.01V).

In an embodiment, if the sinking current detector 115 detects that the specified current in the data line 150 and/or the clock line 145 is within the range of one hundred microamps to one hundred milliamps (100 μA-100 mA), the timer module 135 detects the specified current for a specified interval. In an embodiment, the timer module 135 detects the specified current for a specified interval in the range of one to ten milliseconds (1-10 ms). For example, if the sinking current detector 115 detects that the specified current in the data line 150 and/or the clock line 145 is zero point zero zero one amperes (0.001 amps), the timer module 135 may detect the specified current for the specified interval of five milliseconds (5 ms). The timer module 135 may comprise one or more hardware elements like a timer function, logic gates, software elements, parameters, and an internal organization for detecting the specified interval.

In response to the timer module 135 detecting the specified interval of the specified current, the reset module 140 resets the I2C bus slave 110. For example, if the timer module 135 detects a time interval of five milliseconds (5 ms) of the specified voltage of zero point zero volts (0.01 V), the reset module 140 resets the I2C bus slave 110. The reset module 140 may comprise logic gates, a software configuration, parameters, and other internal organization for communicating a reset signal to the I2C bus slave 110.

The apparatus 100 detects a hung data line 150 and/or clock line 145. In addition, the apparatus 100 resets the hung data line 150 and/or hung clock line 145. The apparatus 100 may be autonomous from the I2C bus masters and/or I2C bus slaves 110.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
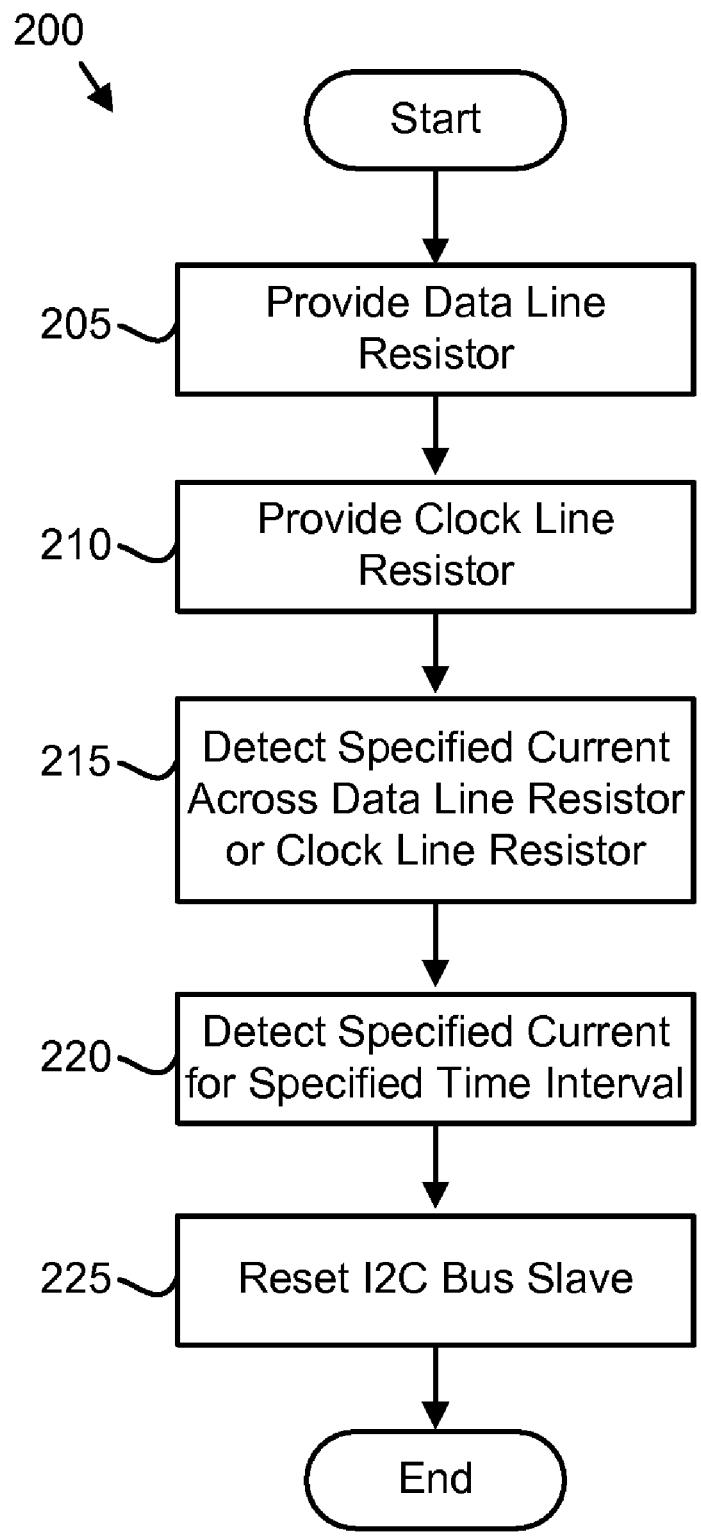
FIG. 2 is a schematic flow chart diagram illustrating one embodiment of an I2C bus slave resetting method in accordance with the present invention.

FIG. 2 is a schematic flow chart diagram illustrating one embodiment of an I2C bus slave resetting method 200 in accordance with the present invention. The method 200 substantially includes the steps to carry out the functions presented above with respect to the operation of the described apparatus 100 of FIG. 1. The description of the method 200 refers to elements of the FIG. 1, like numbers referring to like elements.

The method 200 begins, and in one embodiment, the data line 150 is provided 205 with a data line resistor 120 in series with the data line 150 of the I2C bus 155 in communication with the I2C bus slave 110. In an embodiment, the data line 150 is provided 205 with one or more data line resistors 120 that are of resistance of 1 to 20 ohms (1-20 Ω). For example, the data line 150 may be provided 205 with the data line resistor 120 of ten ohms (10 Ω).

In one embodiment, the clock line 145 is provided 210 with a clock line resistor 125 in series with the clock line 145 of an I2C bus 155 in communication with the I2C bus slave 110. In an embodiment, the clock line 145 is provided 210 with one or more clock line resistors 125 that are of resistance of 1 to 20 ohms (1-20 Ω). For example, the clock line 145 may be provided 210 with the clock line resistor 125 of ten ohms (10 Ω).

The data line differential amplifier 130 and the clock line differential amplifier 165 detect 215 the first specified voltage across the data line resistor 120 and/or the second specified voltage across the clock line resistor 125. In an embodiment, the data line differential amplifier 130 and the clock line differential amplifier 165 detect 215 that the first specified voltage is substantially equal to the data line resistor 120 resistance multiplied by the specified current and/or that the second specified voltage is substantially equal to the clock line resistor 125 resistance multiplied by the specified current respectively. For example, the data line differential amplifier 130 and the clock line differential amplifier 165 may detect 215 that the specific voltage across the data line resistor 120 and/or the clock line resistor 125 is zero point zero two volts (0.02V).

A timer module 135 detects 220 the specified voltage for the specified interval. In an embodiment, the specified interval is in the range of one to ten milliseconds (1-10 ms). For example, the timer module 135 may detect 220 the specified interval of two milliseconds (2 ms) of the specified current of zero point zero zero two amperes (0.002 amps).

In response to the timer module 135 detecting 220 the specified interval of the specified current, the reset module 140 resets 225 the I2C bus slave 110. In one embodiment, the reset module 140 resets 225 a plurality of I2C bus slaves 110 over a reset bus.

The method 200 resets 225 one or more I2C bus slaves 110 by detecting a hung data line 150 and/or a hung clock line 145. The hung data line 150 and/or clock line 145 are detected by detecting a specified current. The reset 225 may be generated autonomously from the I2C bus slaves 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to reset an Inter-Integrated Circuit (I2C) bus slave, the apparatus comprising:
   the I2C bus slave communicating over a data line and a clock line of an I2C bus;
   a sinking current detector detecting a one milliamp current in the data line and the clock line, wherein the sinking current detector comprises
   a ten ohm data line resistor in series with the data line;
   a ten ohm clock line resistor in series with the clock line;
   a data line differential amplifier detecting a 0.01 volt first specified voltage across the data line resistor;
   a clock line differential amplifier detecting a 0.01 volt second specified voltage across the clock line resistor;
   a timer module detecting the first and second specified voltage in the data line and the clock line for a five millisecond time interval; and
   a reset module resetting the I2C bus slave in response to the timer module detecting the five millisecond time interval of the first and second specified voltage.

2. A method for resetting an I2C bus slave, the method comprising:
   providing a ten ohm data line resistor in series with a data line of an I2C bus in communication with the I2C bus slave;
   providing a ten ohm clock line resistor in series with a clock line of the I2C bus;
   detecting a 0.01 volt first specified voltage across the data line resistor with a data line differential amplifier and a 0.01 volt second specified voltage across the clock line resistor with a clock line differential amplifier;
   detecting the first and second specified voltage for a five millisecond time interval; and
   resetting the I2C bus slave in response detecting the first and second specified voltage for the five millisecond time interval.

* * * * *